(12) United States Patent
Brown et al.

(10) Patent No.: US 7,598,954 B2
(45) Date of Patent: Oct. 6, 2009

(54) ADAPTING AND RENDERING GRAPHIC EFFECTS

(75) Inventors: Sara Brown, Redmond, WA (US); Ryan C. Hill, Redmond, WA (US); Dachuan Zhang, Redmond, WA (US); Andrew Hewatt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 67 days.

(21) Appl. No.: 11/366,925

(22) Filed: Mar. 1, 2006

(65) Prior Publication Data

US 2007/0206021 A1 Sep. 6, 2007

(51) Int. Cl.
*G09G 5/00* (2006.01)
*G06T 11/00* (2006.01)

(52) U.S. Cl. .................. 345/467; 345/468; 345/469; 345/611; 345/619

(58) Field of Classification Search ............. 345/619, 345/611, 467–469
See application file for complete search history.

(56) References Cited

U.S. PATENT DOCUMENTS

| | | | |
|---|---|---|---|
| 5,745,597 A * | 4/1998 | Agazzi et al. ............. | 382/182 |
| 6,006,221 A | 12/1999 | Liddy et al. | |
| 6,393,460 B1 | 5/2002 | Gruen et al. | |
| 6,571,236 B1 | 5/2003 | Ruppelt | |
| 6,654,758 B1 | 11/2003 | Teague | |
| 6,801,909 B2 | 10/2004 | Delgado et al. | |
| 7,062,483 B2 | 6/2006 | Ferrari et al. | |
| 7,113,943 B2 | 9/2006 | Bradford et al. | |
| 7,143,348 B1 | 11/2006 | Krause | |
| 7,162,686 B2 | 1/2007 | Blazejewski et al. | |
| 7,296,016 B1 | 11/2007 | Farach-Colton et al. | |
| 2001/0007987 A1 | 7/2001 | Igata | |
| 2001/0049706 A1 | 12/2001 | Thorne | |
| 2002/0059395 A1 | 5/2002 | Liou | |
| 2002/0089533 A1 | 7/2002 | Hollaar et al. | |
| 2003/0076352 A1 | 4/2003 | Uhlig et al. | |
| 2003/0101047 A1 | 5/2003 | Panttaja | |
| 2003/0107584 A1 * | 6/2003 | Clapper ................... | 345/619 |
| 2003/0217047 A1 | 11/2003 | Marchisio | |
| 2004/0153306 A1 | 8/2004 | Tanner et al. | |
| 2004/0227771 A1 * | 11/2004 | Arnold et al. ............. | 345/611 |
| 2004/0243941 A1 | 12/2004 | Fish | |

(Continued)

OTHER PUBLICATIONS

"Adobe After Effects 7.0 Classroom in a Book", Chapter 3, Feb. 2006.*

(Continued)

*Primary Examiner*—Jin-Cheng Wang
(74) *Attorney, Agent, or Firm*—Merchant & Gould LLC

(57) ABSTRACT

Methods, systems, and computer program products adapt and render a graphic effect associated with text rendered via an output device. A method involves receiving a character associated with a graphic effect and determining whether the graphic effect has not been fully rendered with a previously received character via the output device. Graphic effects that are fully rendered are rendered in full fidelity without degradation. In response to determining that the graphic effect has not been fully rendered with the previously received character, the method further involves degrading a display quality of the graphic effect and rendering the graphic effect with degradation and rendering the character to allow the character and the graphic effect to be displayed via the output device substantially in real time.

17 Claims, 4 Drawing Sheets

U.S. PATENT DOCUMENTS

2004/0266414 A1  12/2004  Likwornik

OTHER PUBLICATIONS

Ned Snell, Bob Temple, T. Michael Clark, "Sams Teach Yourself Internet and Web Basics All in One", Chapter 39, May 21, 2003.*

Lori J. Davis, "Thomson Course Technology Paint Shop Pro 8 Power", Chapter 10, Publisher: Muska & Lipman, 2003.*

Paul Ekert, "Pinnacle Liquid Edition 6 for Windows: Visual QuickPro Guide", Chapter 10, Publisher: Peachpit Press, Nov. 2004.*

Bergman et al., "Image Rendering by Adaptive Refinement," The Guide to Computing Literature, website: http://portal.acm.org/citation.cfm?id=15886.15889, Jan. 10, 2006, 7 pages.

Feng et al., "Rate Distortion Optimized Document Coding Using Resolution Enhanced Rendering," IEEE Xplore, website: http://ieeexplore.ieee.org/search/wrapper.jsp?arnumber=958143, 1 page.

Raster Text, website: http://docs.sun.com/app/docs/doc/802-5865/6i9jhrl51?a=view, 12 pages.

Feng et al., "Rate Distortion Optimized Document Coding Using Resolution Enhanced Rendering," IEEE Xplore, website: http://ieeexplore.ieee.org/search/wrapper.jsp?arnumber=958143, 1 page, Oct. 7, 2001.

Raster Text, website: http://docs.sun.com/app/docs/doc/802-5865/6i9jhrl51?a=view, 12 pages, Jan. 10, 2006.

U.S. Official Action mailed Feb. 8, 2008 in U.S. Appl. No. 10/674,753.

U.S. Official Action mailed Apr. 16, 2008 in U.S. Appl. No. 10/675,701.

U.S. Official Action dated Jun. 25, 2008 in U.S. Appl. No. 10/675,838.

U.S. Official Action mailed Jul. 2, 2008 in U.S. Appl. No. 10/675,702.

U.S. Official Action mailed Oct. 14, 2008 in U.S. Appl. No. 10/675,701.

U.S. Official Action mailed Nov. 25, 2008 in U.S. Appl. No. 10/674,753.

U.S. Official Action mailed Dec. 4, 2008 in U.S. Appl. No. 10/675,838.

U.S. Official Action mailed Dec. 31, 2008 in U.S. Appl. No. 10/675,702.

U.S. Official Action mailed Mar. 20, 2009 in U.S. Appl. No. 10/675,701.

U.S. Official Action mailed Apr. 24, 2009 in U.S. Appl. No. 10/674,753.

* cited by examiner

ADAPTING AND RENDERING GRAPHIC EFFECTS

BACKGROUND

With the advent of the computer age, computer and software users have grown accustomed to user-friendly software applications that help them write and prepare presentations with impressive graphic effects, such as raster-based effects. For example, modern electronic word processing and/or presentation applications allow users to prepare a variety of documents utilizing a raster-based shadow feature with the typed text, pictures, data or other useful objects. A raster-based effect is a graphic effect, which alters the pixels on screen to produce, for example, a blur or glow. When a user has applied some raster-based effects to their text and would like to edit or move the text around the screen, the applications re-render the text to show the user what is happening. However, rendering all of the graphic effects applied to the text can take a long time. The user will not see the text until the rendering has completely finished. The high latency between what a user types and what the user sees can be attributed to the display screen temporarily losing a portion of the text because the application did not finish rendering the text with raster-based effects while having to process more typing. This high latency can cause confusion and an enormously bad experience for the user.

Some conventional applications will either dial down or degrade graphic effects or partially or completely turn the graphic effects off while a user is editing and/or typing text. Then as soon as the user clicks out or performs some action, such as a right click or a "Render Completely" menu selection, the application will render the graphic effects completely with higher resolution. Other applications will key off of a machine setup at login and/or take a user out of the document to type into a separate text editing experience or text box when editing or typing. These conventional applications setup a static response based on user input and always dial down or turn off effects with changes or additions to the text. If the user feels like the application is too slow, he or she has to manually go in and lower the quality for a faster rendering of text with the graphic effects.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing an adaptive editing environment in which to render one or more graphic effects associated with text rendered via an output device, such as a display screen. According to an embodiment of the invention, applications in conjunction with a graphics engine dynamically render graphic effects at a quality level that a computing system can manage instead of rendering the graphic effects in full fidelity or resolution each time a user wishes to edit or move the text. Graphic effects rendered in full fidelity are rendered without degradation. The display quality of the graphic effect is downgraded or degraded to an appropriate quality level each time the user chooses to perform an action on the text. When the user has stopped editing the text, then the graphics engine works on rendering the full fidelity version of the applied graphic effects associated with the text. Upon completion of the full fidelity version, the graphics engine pushes the text with graphic effects to a display screen of the computing system.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention adapt to the current typing and system speed to render one or more graphic effects associated with text rendered via an output device. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
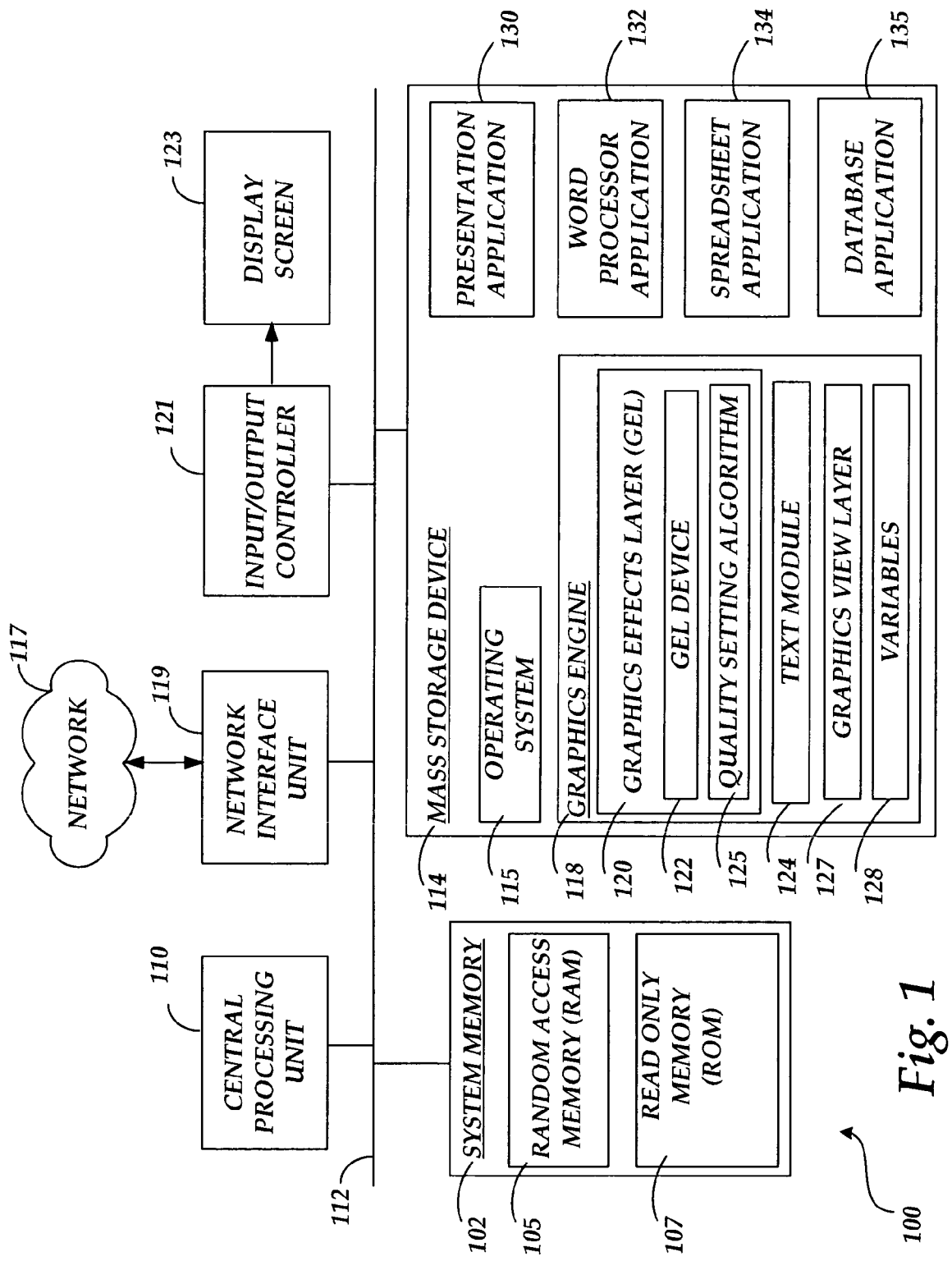
FIG. 1 illustrates an exemplary computing system.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 110, system memory 102, and a mass storage device (MSD) 114. Depending on the exact configuration and type of computing device, the system memory 102 may be volatile (such as RAM 105), non-volatile (such as ROM 107, flash memory, etc.) or some combination of the two. The MSD 114 typically includes an operating system 115 suitable for controlling the operation of a networked personal computer, such as the WINDOWS® operating systems from MICROSOFT CORPORATION of Redmond, Wash. The MSD 114 may also include one or more software applications 130, 132, 134 and 135 and a graphics engine 118. The graphics engine 118 includes a graphic effects layer (GEL) 120, a text module 124, a graphics view layer 127, and variables 128.

According to embodiments of the invention, the software applications may comprise many types of programs, such as an electronic mail program, a calendaring program, an Internet browsing program, and the like. An example of such programs is OUTLOOK® manufactured by MICROSOFT CORPORATION. The applications may also comprise a multiple-functionality software application for providing many other types of functionalities. Such a multiple-functionality application may include a number of program modules, such as a word processing program 132, a spreadsheet program 134, a slide presentation program 130, a database program 135, and the like. An example of such a multiple-functionality application is OFFICE™ manufactured by MICROSOFT CORPORATION. According to embodiments of the present invention, the applications are illustrative of any software application working in conjunction with the graphics engine 118 to change a user interface or screen display with revisions and/or additions to text with one or more graphic effects applied.

The graphics engine 118 utilizes an adaptive editing mode with software applications when text that has graphic effects applied to it needs to be rendered in any way. This mode will allow the user of a software application, for example the presentation application 130, change the text at any speed and see text rendered at a quality level determined by the current performance level or speed of the computing device 100. The GEL 120 is an underlying layer of the graphics engine 118 used to render a run or body of text. The GEL 120 receives commands to render text at a certain quality level from higher layer modules, such as a GEL device 122. The GEL device 122 is a higher level module that sends a render command with a calculated quality level to the GEL 120, maintains the algorithm variables 128 described below, and determines if an upgrade or downgrade in quality level is needed for the graphic effect. In an embodiment of the present invention, the GEL 120 does not keep state information as it restarts each time it is called.

The text module 124 is responsible for rendering or displaying text as it is received. The GVL 127, or another client utilizing the GEL 120 functionality, is responsible for re-rendering the text with graphic effect in full fidelity when the user stops editing the text. The GVL 127 is not assumed to hold state, but can query underlying layers to determine render quality. Thus, when a character is typed and the quality level has not yet been set (occurs when a new GEL device is created), then the GEL device 122 will initialize the quality level to the best quality and send a render command to the GEL layer 120. After this initial setting of the quality level, the GEL device 122, working in conjunction with a quality setting algorithm 125, is used to determine the current quality level as long as the GEL device 122 is available.

The MSD 114 is connected to the CPU 110 through a mass storage controller (not shown) connected to the system bus 112. The MSD 114 and its associated computer-readable media, provide non-volatile storage for the computing device 100. Although the description of computer-readable media contained herein refers to a MSD, such as a hard disk or RAID array, it should be appreciated by those skilled in the art that computer-readable media can be any available media that can be accessed by the CPU 110.

The CPU 110 may store data to and access data from the MSD 114. Data is transferred to and received from the MSD 114 through the system bus 112. The CPU 110 may be a general-purpose computer processor. Furthermore, as mentioned below, the CPU 110, in addition to being a general-purpose programmable processor, may be firmware, hard-wired logic, analog circuitry, other special purpose circuitry, or any combination thereof.

According to various embodiments of the invention, the computing device 100 can operate in a networked environment, as shown in FIG. 1, using logical connections to remote computing devices via network communication, such as an Intranet, or a local area network (LAN). The computing device 100 may connect to the network 117 via a network interface unit 119. It should be appreciated that the network interface unit 119 may also be utilized to connect to other types of networks and remote computer systems. The computing device 100 also includes an input/output controller 121 for receiving and processing input from a number of devices, including a keyboard (not shown). Similarly, the input/output controller 121 provides output to a display screen 123, a printer, or other type of output device.

A computing device, such as the computing device 100, typically includes at least some form of computer-readable media. Computer readable media can be media that can be accessed by the computing device 100. By way of example, and not limitation, computer-readable media might comprise computer storage media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the computing device 100.

Computer-readable media may also be referred to as computer program product.

Figure 2:
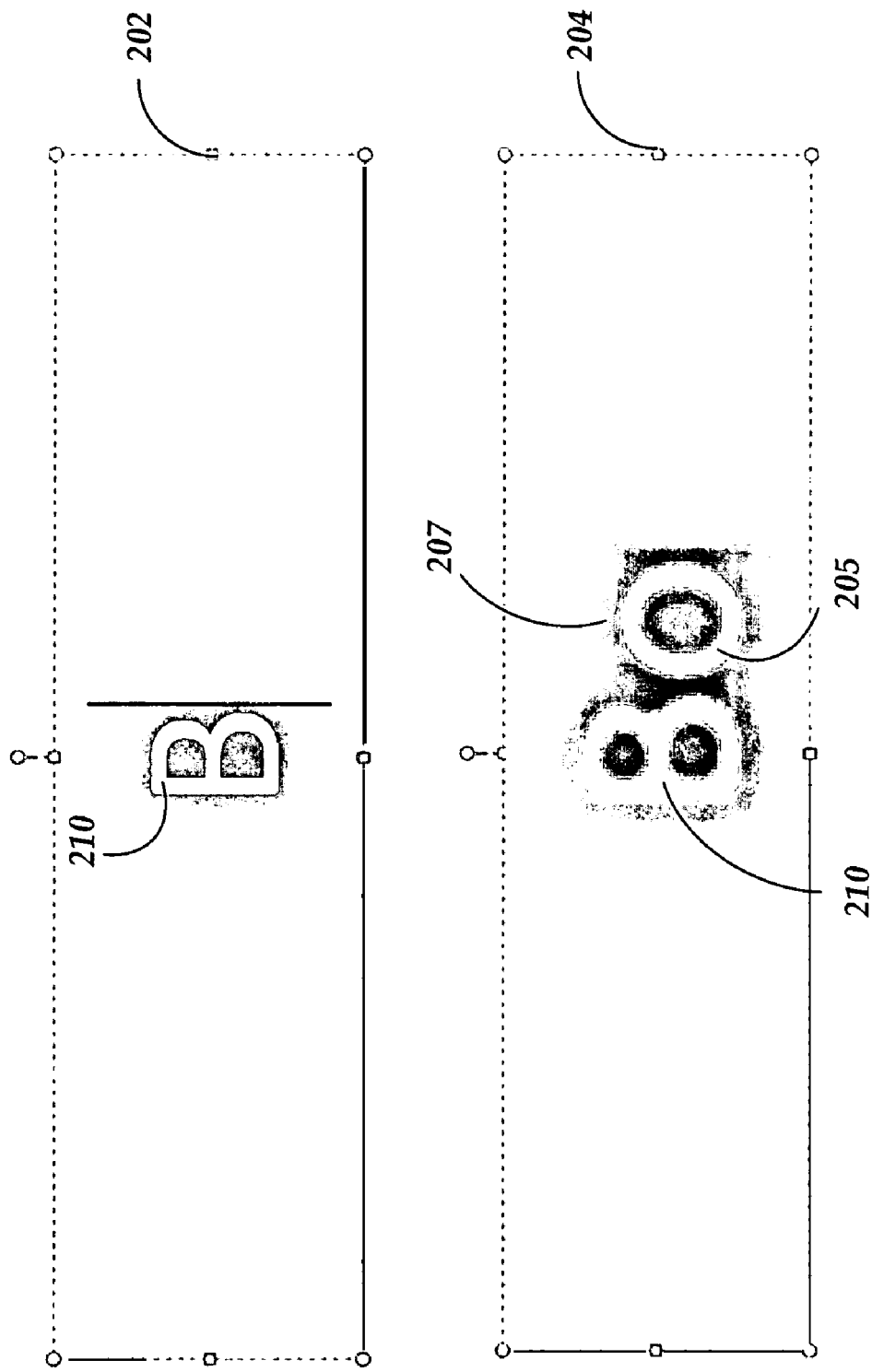
FIG. 2 illustrates computer screen displays rendering text with a raster-based graphic effect.

FIG. 2 illustrates computer screen displays 202 and 204 rendering text with a raster-based graphic effect according to an embodiment of the present invention. The display 202 includes a character 210 having a graphic effect, in this case a raster-based glow effect, rendered in full fidelity. Graphic effects rendered in full fidelity are rendered without degradation. The display 204 illustrates an edit or added text and a re-rendering of the display 202 with a second character 205 also having a graphic effect 207. Here the user may have typed an "o" key and immediately the text is shown with the raster-based effect 207 having a degraded quality that the computing device can render substantially in real time.

Figure 3:
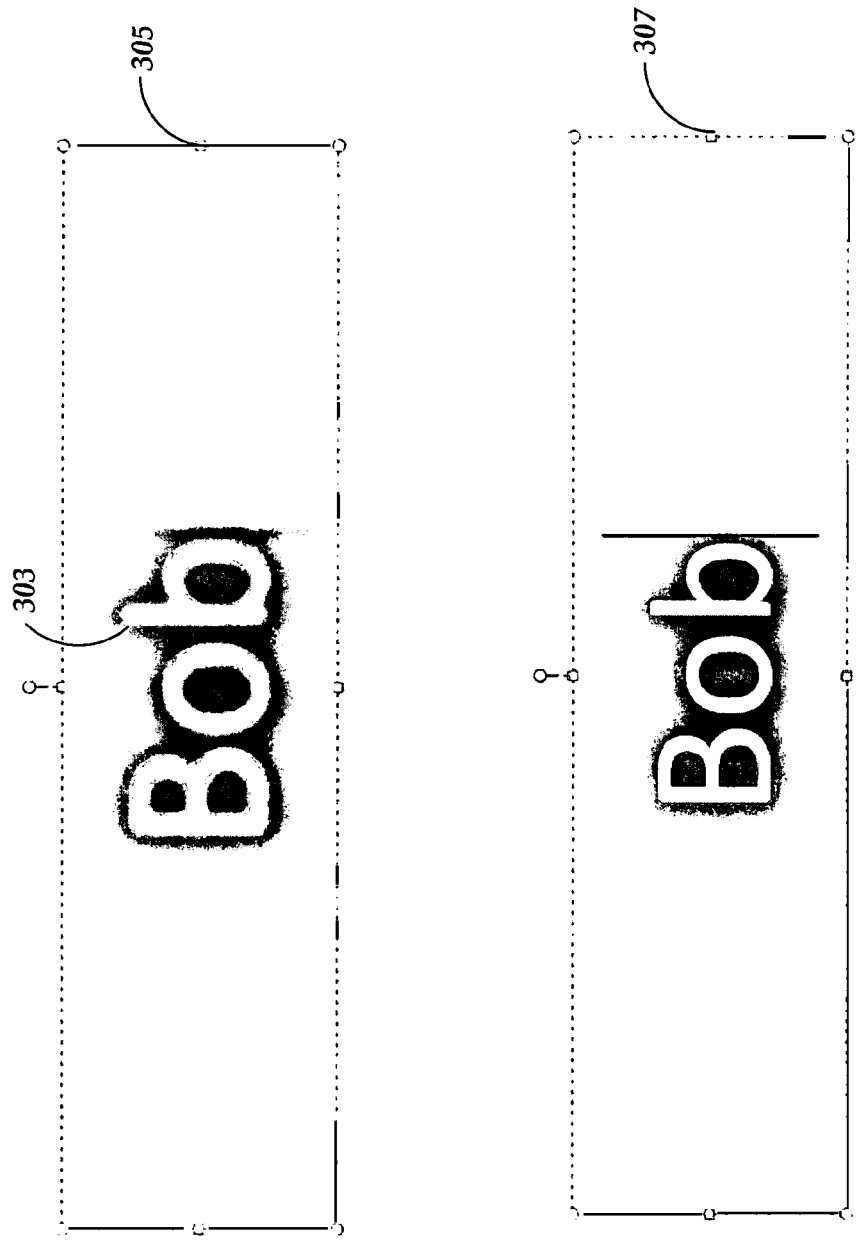
FIG. 3 illustrates computer screen displays rendering text with a raster-based graphic effect.

FIG. 3 illustrates computer screen displays 305 and 307 rendering text with a raster-based graphic effect according to an embodiment of the present invention. The display 305 illustrates an edit or added text and a re-rendering of the display 204 with a third character 303 also having a graphic effect 207. At this point the user has typed a "b" key and once again the text is shown immediately with all text effects, such as the graphic effect 207, applied in a degraded quality that the rendering computing device can handle. Notice that the graphic effect 207 has been further degraded from the last time the user typed a character. This further degradation may be attributed to the computing device experiencing a slowdown or the user may have begun to type faster. Either way a copy of the text needed to be pushed out to the display screen 123 faster than with the previous character and so the graphic effects were further degraded.

Quality or quality levels or graphic effects are measured in integer amounts going from 1 to n where n is a positive integer. This quality level represents the granularity of the render so the lower the number, the higher the quality. Some examples of what quality levels look like are provided below:

TABLE 1

Sample Quality Levels

| Quality: 1/1 (100%) | Quality: 1/4 (25%) | Quality: 1/9 (11%) |

Shown here is the rendering of 1×1, 2×2 and 3×3 pixel granularity. For the 2×2 case the GEL 120 (FIG. 2) will effectively render all 4 pixels as one color, which will be the average color across that area on the screen. The same technique is used for rendering all other quality levels as well. The quality level can currently be dropped down or degraded to any level, however usability or legibility may determine that a lower bound is needed in order to maintain readability of text. The quality level is a variable used to redraw any raster-based effects that may need updating. The algorithm variables 128 for the GEL device 122 are defined and updated as described below:

Algorithm Variables

The GEL device 122 measures and records the following values:
- Q: (Quality)—current quality level sent to GEL 120 (positive integer value)
- RC: (RenderCompleted)—time GEL 120 spent rendering items that completed (time in ms)
- RA: (RenderAborted)—time GEL 120 spent rendering items that were aborted (time in ms)
- UP: (UpgradePoint)—ratio level at which a quality upgrade should occur (0-1)
- SP: (ScalePoint)—time at which RC and RA should be scaled using scale factor (time in ms)
- SF: (ScaleFactor)—factor by which RC and RA should be multiplied by (0-1) Suggested values for the above variables are validated via usability. The suggested values according to an embodiment of the present invention include:

UP: (0.8)
SP: (5000)
SF: (0.1)

As this algorithm receives information back from the GEL 120, the variables RC and RA grow and a ratio equal to (RC/(RA+RC)) eventually reaches a steady state beyond which the influence of new data is minimal at best. Thus, the variables RC and RA are decreased in the following manner:

If $(RC+RA)>=SP$

Then $RC=RC*SF$ and $RA=RA*SF$

These variables are checked after each call to GEL 120 after a result from the last render has been added to either RC or RA. This reduces the influence of aged measurements on determining whether to upgrade the quality of the character.

Figure 4:
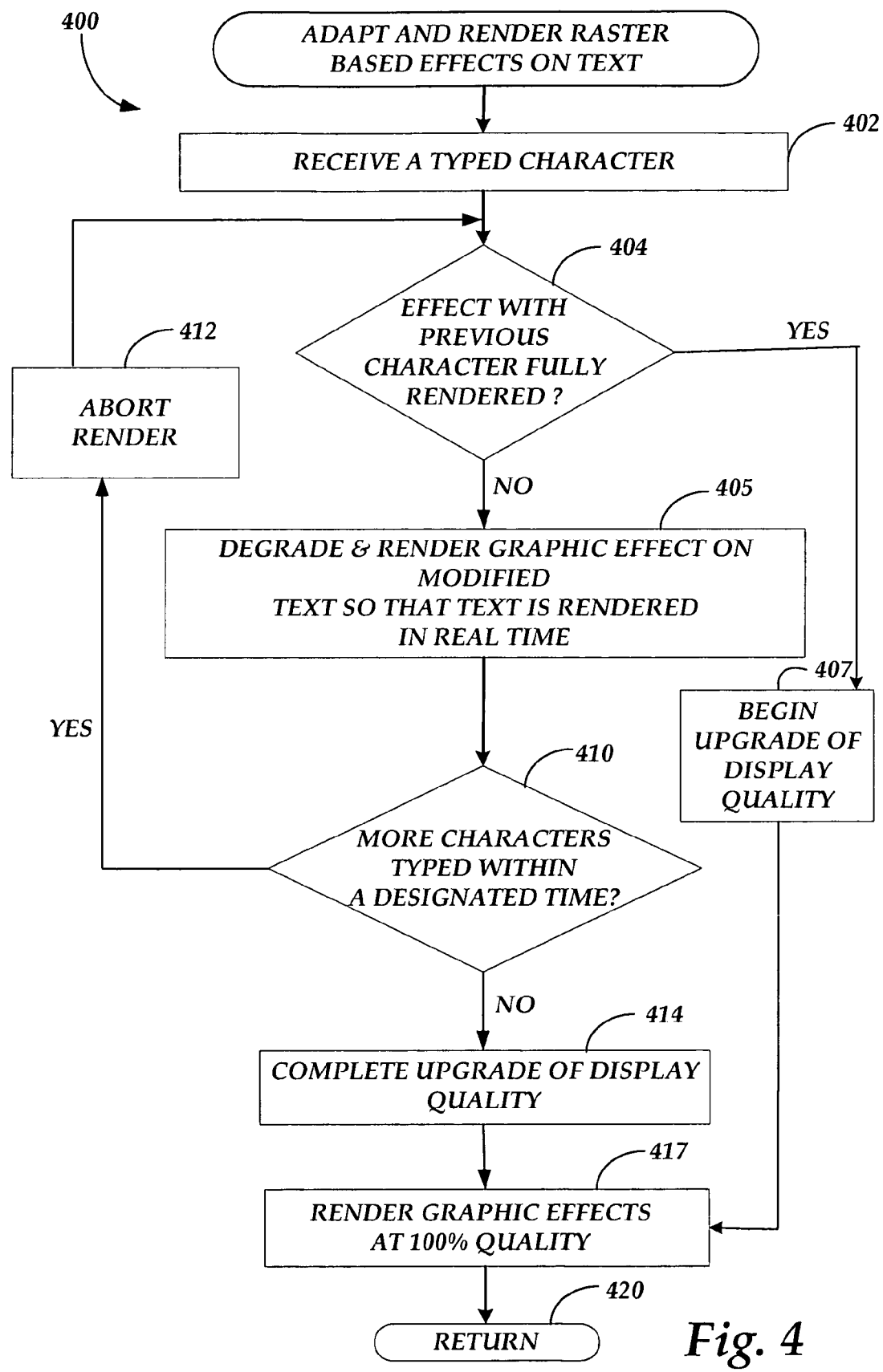
FIG. 4 is an illustrative routine performed in adapting and rendering one or more graphic effects associated with text.

FIG. 4 is an illustrative routine 400 performed in adapting and rendering one or more graphic effects associated with text according to an embodiment of the present invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIGS. 1-4, the logical flow 400 begins at operation 402, where the computing device 100, receives a character 205 associated with a graphic effect 207. It should be appreciated that when a user first applies a new effect to a selection or body of text, the graphic effect is displayed or rendered in full fidelity. Also, when a new graphic, such as WORDART™ from Microsoft Corporation is inserted into a document the computing device 100 renders the text in full fidelity (quality level Q=1).

Next, at operation 404, the computing device 100 determines whether the graphic effect 207 has not been fully rendered with a previously received character 210 via the output device 123. The graphic effect 207 is fully rendered when it is rendered in full fidelity. When the graphic effect 207 has not been fully rendered with the previously received character 210, the computing device 100 at operation 405 degrades the display quality of and renders the graphic effect 207 along with rendering the character (205). This is to allow the character 205 and the graphic effect 207 to be displayed via the output device 123 substantially in real time. It should be appreciated that in some embodiments of the present invention, only a display quality of the graphic effect 207 applied to a word that includes the character 205 is degraded and not a display quality of all graphic effects displayed via a display screen Determining a downgrade or degrade is based on the premise that the text must be rendered by the time the user enters a new character. Thus, when the computing device 100 has received one or more new characters to render and the last render call sent to GEL 120 has not returned and the quality decrease will not violate a lower bound that is put in place to maintain a level of readability within the text, then the variable Q is set as greater than 1 thereby degrading the quality as governed by the following equations:

Then If $(Q+1)<=\text{floor}(1+0.25 \text{ (minimum font size of text being rendered)}^{\char`\^}0.6))$ Then $Q=Q+1$ Thus, the display quality is not degraded when the font size of the character is less than or equal to a minimum threshold value thereby safeguarding legibility. After this quality change, the full text with the graphic effect 207 is re-rendered by GEL 120 using the new quality level Q. As described below, this re-rendering is aborted if the device receives another new character or realayout of text prior to rendering completion.

When at operation 404, the graphic effect 207 is fully rendered with the previous character, the logical flow 400 continues from operation 404 to operation 407 where the computing device 100 initiates an upgrade to the display quality of the graphic effect 207. The operational flow then continues from operation 407 to operation 417 described below.

From operation 405, the operational flow 400 continues to operation 410 where the computing device 100 determines whether another character 303 has been received within a designated time. When another character 303 has been received within the designated time, the logical flow 400 continues to operation 412 where the computing device 100 aborts rendering of the graphic effect. The logical flow 400 then returns to operation 404 described above. When at operation 410, another character 303 is not received within the designated time, the logical flow 400 continues from operation 410 to operation 414. At operation 414 the computing device 100 completes the upgrade of display quality. When determining if a quality level should be upgraded the computing device 100 verifies whether text can be rendered at this higher level. Thus the following rule or equation is used:

If $(RC/(RC+RA))>=UP$

Then If $Q>1$

Then $Q=1$

This equation checks to see if the ratio of the completed rendering time to the total rendering time is high enough to merit a quality upgrade.

Next, at operation 417 the computing device 100 renders the graphic effect 207 with the character 205 in full fidelity without degradation at operation 417. It should be appreciated that the graphic effect 207 is displayed in full fidelity with each character without any additional user action required. The logical flow 400 then returns control to other routines at return operation 420.

Thus, the present invention is presently embodied as methods, systems, computer program products or computer readable mediums encoding computer programs for adapting and rendering one or more graphic effects.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer-implemented method for adapting and rendering a graphic effect associated with text rendered via an output device, comprising:

receiving, by a computing system, a character associated with the graphic effect, wherein the received character is an additional character to be added to at least one previously received character also associated with the graphic effect;

determining, by the computing system, whether the graphic effect has not been fully rendered with the at least one previously received character by determining whether a render call sent to a graphics effects layer for fully rendering the at least one previously received character has not returned by the time the character to be added is received; and in response to determining, by the computer system, that the graphic effect has not been fully rendered with the at least one previously received character, degrading a display quality of the graphic effect from a full fidelity and rendering the graphic effect and the character at less than the full fidelity to allow the character and the graphic effect to be displayed via the output device in substantially real time, wherein degrading a display quality of the graphic effect and rendering the graphic effect comprises measuring each of the following:

a) a current quality of the graphic effect applied to the previously received character;

b) an amount of time spent rendering graphic effects wherein the graphic effects were fully rendered;

c) an amount of time spent rendering graphic effects wherein rendering the graphic effects was aborted;

d) a ratio level, between a value of zero and a value of one, at which a display quality upgrade is to occur;

e) an amount of time at which b) and c) are to be scaled using a scale factor;

f) a factor, between a value of zero and a value of one, by which b) and c) are to be multiplied; and g) a font size of the character being rendered;

wherein the display quality is not degraded when the font size of the character is less than or equal to a minimum threshold value thereby safeguarding legibility.

2. The method of claim 1, further comprising:

determining, by the computing system, whether another character has been received within a designated time; and aborting, by the computing system, a rendering of the graphic effect in response to determining that another character has been received within a designated time.

3. The method of claim 2, further comprising:

completing, by the computing system, the upgrade of the display quality of the graphic effect in response determining that another character has not been received within a designated time; and rendering, by the computing system, the graphic effect with each character in full fidelity without degradation.

4. The method of claim 1, wherein determining, by the computing system, whether at least one previously received character has not been fully rendered with the graphic effect further comprises:

measuring a current quality level of the graphic effect to determine how much to degrade the quality of the graphic effect.

5. The method of claim 3, wherein rendering, by the computing system, the graphic effect with each character in full fidelity without degradation comprises rendering the graphic effect in full fidelity without any additional user action required.

6. The method of claim 1, further comprising in response to determining that the graphic effect has not been fully rendered with the at least one previously received character adjacent to the character, initiating an upgrade of the display quality of the graphic effect and rendering the character and the graphic effect associated with the character in full fidelity without degradation via the output device in substantially real time.

7. The method of claim 1, wherein rendering the graphic effect with degradation and rendering the character comprises displaying via a display screen each character with all graphic effects applied to the characters.

8. The method of claim 1, wherein degrading a display quality of the graphic effect and rendering the graphic effect with degradation comprises degrading only a display quality of the graphic effect applied to a word that includes the character and not degrading a display quality of all graphic effects displayed via a display screen.

9. The method of claim 1, wherein rendering the graphic effect with degradation and rendering the character comprises displaying via a display screen a degraded shadow around one or more text characters.

10. The method of claim 1, wherein measuring d) comprises:
   determining whether a ratio of b) to the sum of b) plus c) is greater than or equal to d);
   determining whether a) is greater than 1;
   setting a) to equal 1, in response to a) being greater than 1 and the ratio of b) to the sum of b) plus c) being greater than or equal to d).

11. The method of claim 10, further comprising:
   decreasing b) and c) in response to the ratio of b) to the sum of b) plus c) reaching a steady state beyond which an influence of new measuring is minimal wherein when b) plus c) is greater than or equal to e), b) is set to equal b) multiplied by f) and c) is set to equal c) multiplied by f) thereby reducing the influence of aged measurements on determining whether to upgrade the quality of the character.

12. A computer-readable storage medium comprising computer-executable instructions, which when executed on a computer, will cause the computer to perform a method of adapting and displaying text and a raster-based effect associated with the text, via a display device, the method comprising:
   receiving, by a computing system, a character associated with the raster-based effect, wherein the received character is an additional character to be added to a second character received just prior to the character;
   determining, by the computing system, whether the raster-based effect is displayed in full fidelity via the display device with the second character received just prior to the character by determining whether a render call sent to a graphics effects layer for fully rendering the second character has not returned by the time the character to be added is received;
   in response to determining, by the computing system, that the raster-based effect is not displayed in full fidelity with the second character, degrading a display quality of the raster-based effect from a full fidelity and display the raster-based effect at less than the full fidelity to allow the character and the raster-based effect to be displayed via the display device substantially in real time, wherein degrading a display quality of the raster-based effect from a full fidelity comprises measuring a font size of the character being rendered, wherein the display quality is not degraded when the font size of the character is less than or equal to a minimum threshold value thereby safeguarding legibility;
   in response to determining, by the computing system, that the raster-based effect is displayed in full fidelity with the second character, displaying the raster-based effect in full fidelity with the character substantially in real time;
   determining whether another character has been received within a designated time;
   aborting a displaying of the raster-based effect in response to determining that another character has been received within a designated time;
   completing the upgrade of the display quality of the raster-based effect in response to determining that another character has not been received within a designated time, wherein the upgrade of the display quality of the raster-based effect is completed when a ratio of an amount of time spent rendering raster-based effects, wherein the raster-based effects were fully rendered, to the sum of the amount of time spent rendering raster-based effects, wherein the raster-based effects were fully rendered, plus an amount of time spent rendering raster-based effects, wherein rendering the raster-based effects was aborted, is greater than or equal to a ratio level at which a display quality upgrade is to occur, when a current quality of the raster-based effect applied to the at least one previously received character is greater than 1, and when the current quality of the raster-based effect applied to the at least one previously received character is set to equal 1; and
   displaying the raster-based effect with each character in full fidelity without degradation.

13. The computer-readable storage medium of claim 12, wherein determining whether the raster-based effect is displayed in full fidelity via the display device with the second character comprises measuring a current quality level of the raster-based effect to determine how much to degrade the quality of the raster-based effect.

14. A computer-implemented system for adapting and displaying text and a raster-based effect associated with the text, the system comprising:
   a software application and a graphics engine operative to:
      receive a character associated with the raster-based effect, wherein the received character is an additional character to be added to a second character received just prior to the character;
      determine whether the raster-based effect is displayed in full fidelity via a display device with the second character received just prior to the character by determining whether a render call sent to a graphics effects layer for fully rendering the at least one previously received character has not returned by the time the character to be added is received; and
      in response to determining that the raster-based effect is not displayed in full fidelity with the second character, degrade a display quality of the raster-based effect from a full fidelity, wherein degrading a display quality of the raster-based effect from a full fidelity comprises measuring each of the following:
         a) a current quality of the graphic effect applied to the previously received character;
         b) an amount of time spent rendering graphic effects wherein the graphic effects were fully rendered;
         c) an amount of time spent rendering graphic effects wherein rendering the graphic effects was aborted;
         d) a ratio level, between a value of zero and a value of one, at which a display quality upgrade is to occur;
         e) an amount of time at which b) and c) are to be scaled using a scale factor;

f) a factor, between a value of zero and a value of one, by which b) and c) are to be multiplied; and g) a font size of the character being rendered;

wherein the display quality is not degraded when the font size of the character is less than or equal to a minimum threshold value thereby safeguarding legibility; and the display device operative to: display the raster-based effect at last than the full fidelity to allow the character and the raster-based effect to be displayed via the display device substantially in real time.

15. The system of claim 14, wherein the graphics engine is further operative to:

determine whether another character has been received within a designated time; and abort displaying of the raster-based effect in response to determining that another character has been received within a designated time.

16. The system of claim 15, wherein the graphics engine is further operative to: complete the upgrade of the display quality of the raster-based effect in response determining that another character has not been received within a designated time; and wherein a display device is further operative to display the raster-based effect in full fidelity without degradation.

17. The system of claim 14, wherein a display device operative to display the raster-based effect with degradation is operative to display each character with all raster-based effects applied to the characters.

* * * * *